United States Patent
Shin et al.

(10) Patent No.: US 11,310,476 B2
(45) Date of Patent: Apr. 19, 2022

(54) VIRTUAL REALITY IMAGE REPRODUCTION DEVICE FOR REPRODUCING PLURALITY OF VIRTUAL REALITY IMAGES TO IMPROVE IMAGE QUALITY OF SPECIFIC REGION, AND METHOD FOR GENERATING VIRTUAL REALITY IMAGE

(71) Applicants: ALPHACIRCLE CO., LTD., Seoul (KR); UNIVERSITY-INDUSTRY COLLABORATION & CONSULTING FOU, Hwaseong-Si (KR)

(72) Inventors: Eui Hyun Shin, Seoul (KR); Ta Sik Chung, Seoul (KR); Dong Woo Cha, Seoul (KR)

(73) Assignees: ALPHACIRCLE CO., LTD., Seoul (KR); UNIVERSITY-INDUSTRY COLLABORATION & CONSULTING FOUNDATION, Hwaseong-si (KR)

( * ) Notice: Subject to any disclaimer, the term of this patent is extended or adjusted under 35 U.S.C. 154(b) by 0 days.

(21) Appl. No.: 17/059,260

(22) PCT Filed: Jun. 27, 2019

(86) PCT No.: PCT/KR2019/007799
§ 371 (c)(1),
(2) Date: Nov. 27, 2020

(87) PCT Pub. No.: WO2020/004967
PCT Pub. Date: Jan. 2, 2020

(65) Prior Publication Data
US 2021/0211631 A1 Jul. 8, 2021

(30) Foreign Application Priority Data
Jun. 28, 2018 (KR) .......................... 10-2018-0074626

(51) Int. Cl.
*H04N 13/167* (2018.01)
*G06F 3/01* (2006.01)
(Continued)

(52) U.S. Cl.
CPC .......... *H04N 13/167* (2018.05); *G06F 3/013* (2013.01); *G06T 3/4038* (2013.01); *G06T 5/50* (2013.01); *H04N 13/111* (2018.05)

(58) Field of Classification Search
None
See application file for complete search history.

(56) References Cited

U.S. PATENT DOCUMENTS 9,369,689 B1 * 6/2016 Tran .......................... G06T 7/60
2017/0339416 A1 * 11/2017 Hendry ................ H04N 19/174
(Continued)

FOREIGN PATENT DOCUMENTS

KR 10-2016-0017006 A1 8/2017
KR 10-1944050-0000 B2 11/2017

*Primary Examiner* — Talha M Nawaz
(74) *Attorney, Agent, or Firm* — Nicholas Park

(57) ABSTRACT

Example embodiments relate to a virtual reality image playing device playing a plurality of virtual reality images to improve the quality of a predetermined area, the virtual reality image comprising, an image input module configured to receive the plurality of virtual reality images stitched from an original image created to realize virtual reality, a multi-rendering module configured to render the plurality of virtual reality images, a synchronization module configured to generate sync information to synchronize the plurality of virtual reality images and an image playing module configured to use the sync information to play the plurality of synchronized virtual reality images.

11 Claims, 5 Drawing Sheets

(51) Int. Cl.
*G06T 3/40* (2006.01)
*H04N 13/111* (2018.01)
*G06T 5/50* (2006.01)

(56) References Cited

U.S. PATENT DOCUMENTS

| | | | | |
|---|---|---|---|---|
| 2017/0347163 | A1* | 11/2017 | Wang | H04N 21/8146 |
| 2017/0366812 | A1* | 12/2017 | Abbas | H04N 19/167 |
| 2018/0131858 | A1* | 5/2018 | Goo | H04L 67/125 |
| 2018/0342043 | A1* | 11/2018 | Vandrotti | H04N 13/282 |
| 2019/0104326 | A1* | 4/2019 | Stockhammer | H04L 67/02 |
| 2020/0312029 | A1* | 10/2020 | Heinen | G06T 17/20 |
| 2020/0336762 | A1* | 10/2020 | Lee | H04N 19/597 |
| 2020/0389676 | A1* | 12/2020 | Denoual | H04N 21/23439 |

* cited by examiner

[Fig 1]
(a)
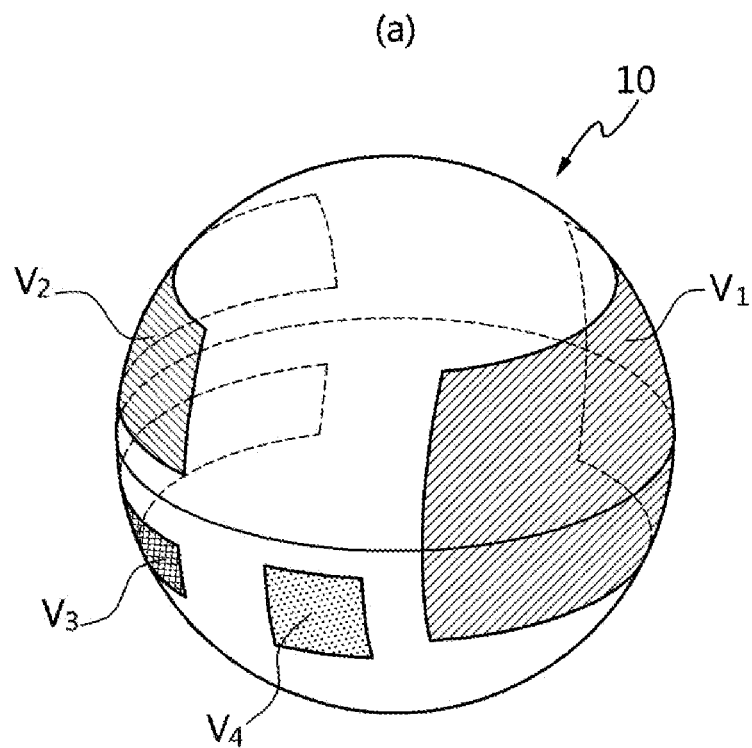
(b)
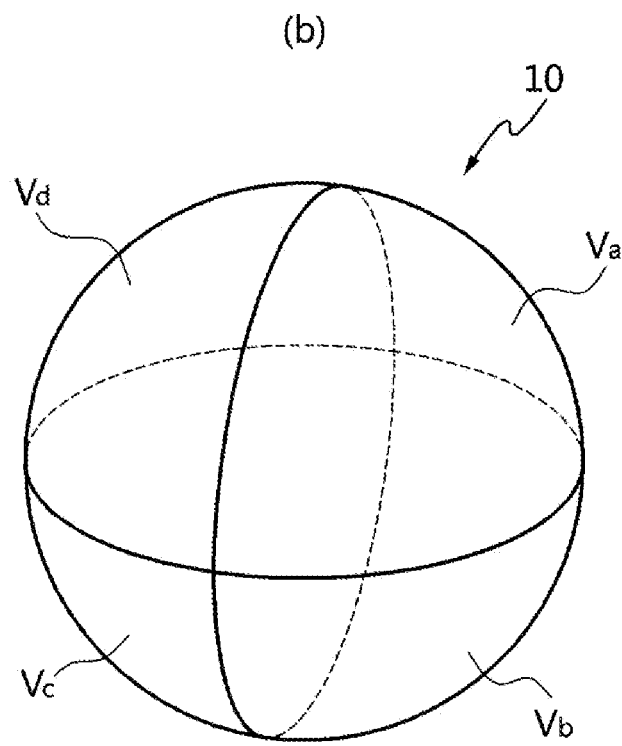

[Fig 2]
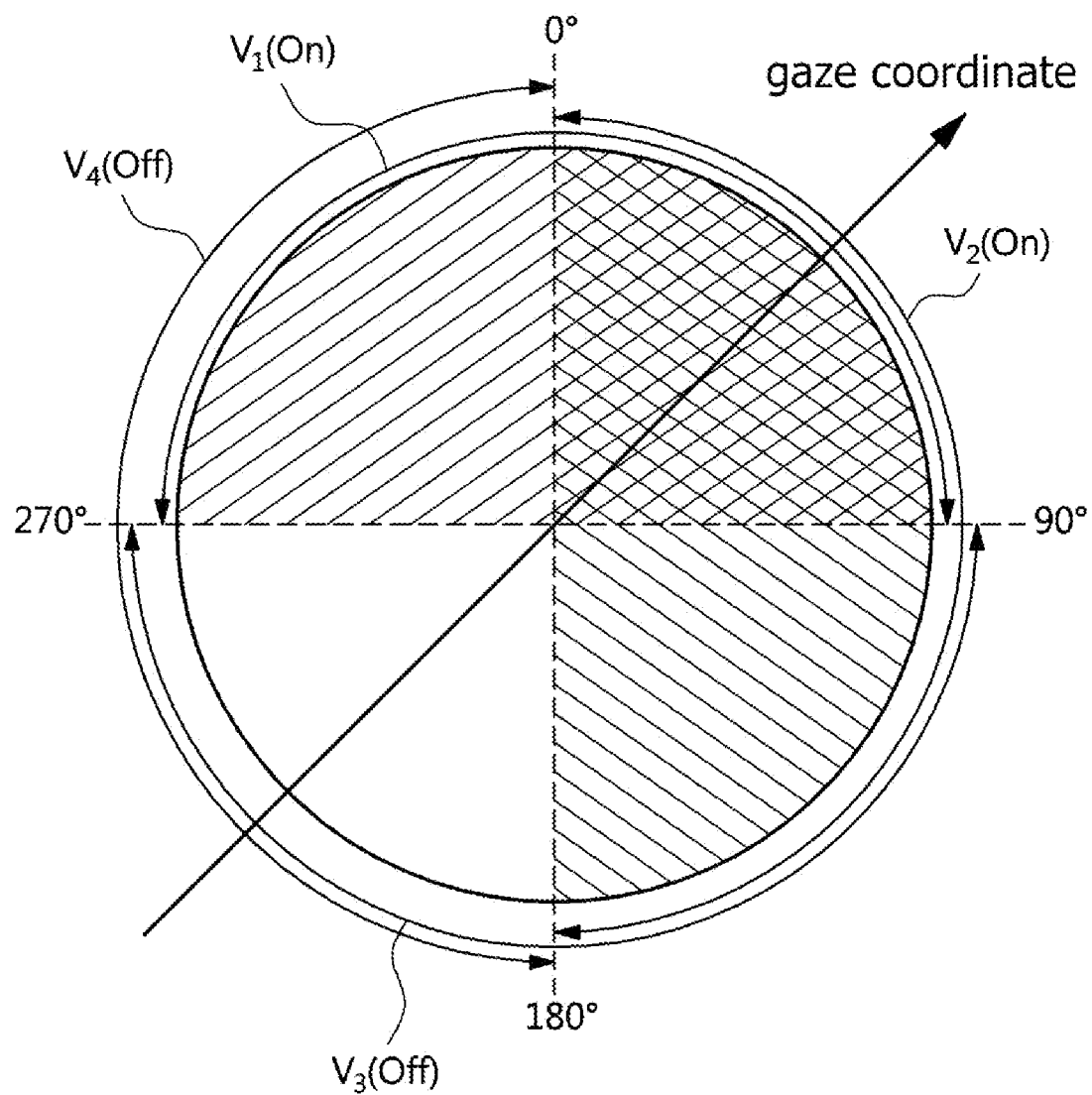

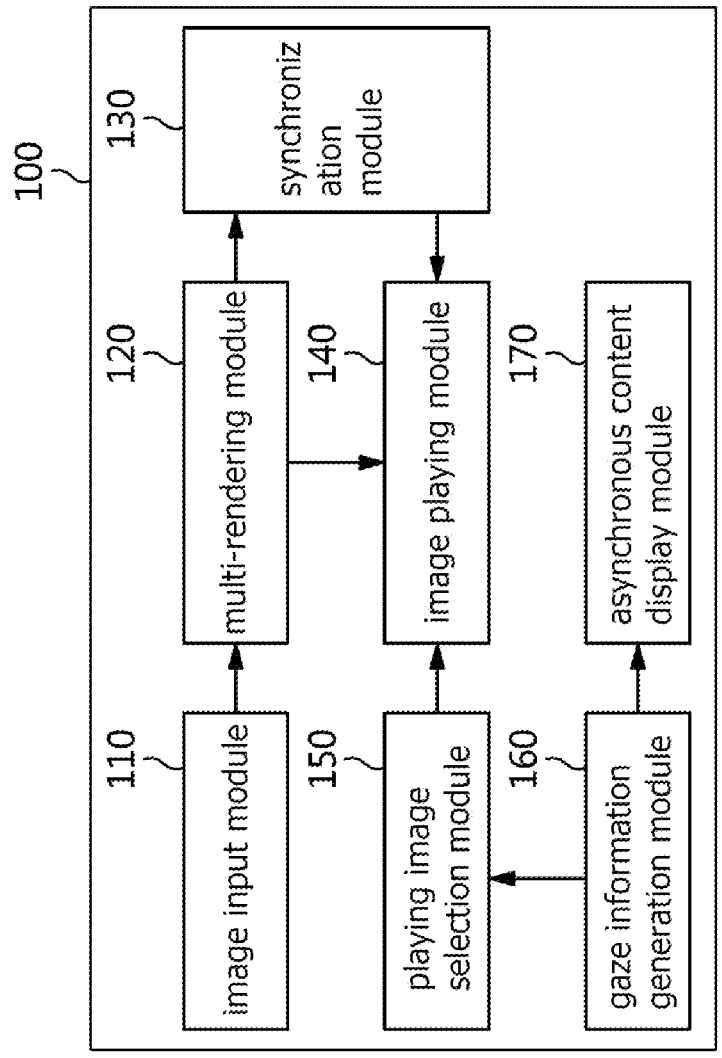
[Fig 3]

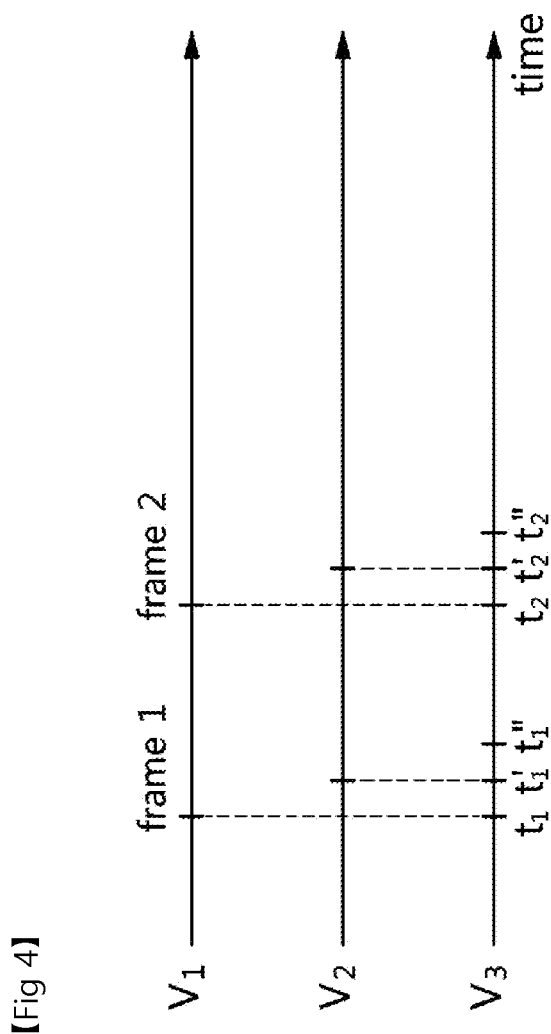

[Fig 5]
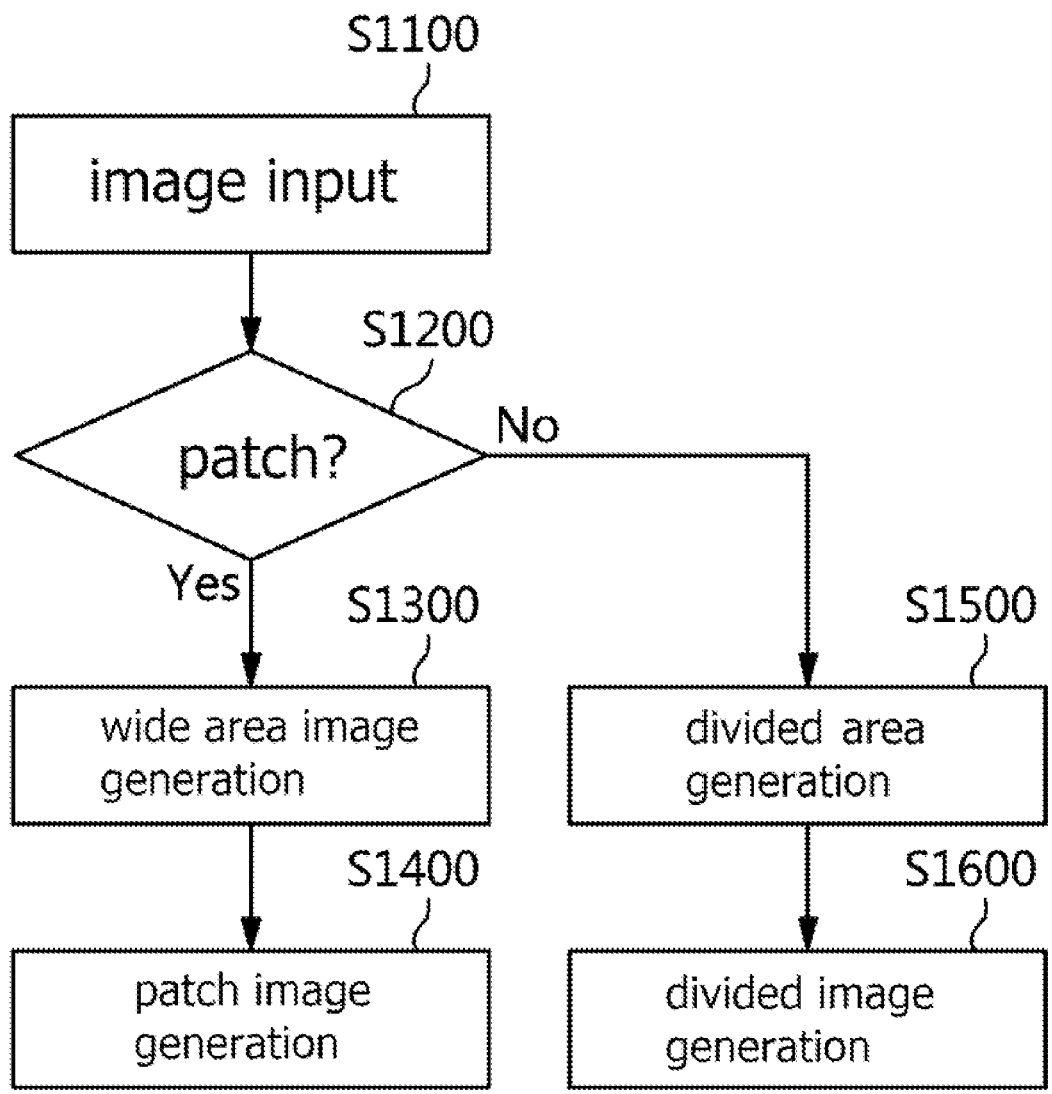

VIRTUAL REALITY IMAGE REPRODUCTION DEVICE FOR REPRODUCING PLURALITY OF VIRTUAL REALITY IMAGES TO IMPROVE IMAGE QUALITY OF SPECIFIC REGION, AND METHOD FOR GENERATING VIRTUAL REALITY IMAGE

CROSS-REFERENCE TO RELATED APPLICATION

This application claims the benefit of priority from Korean Patent Application No. 10-2018-0074626, filed on Jun. 28, 2018, in the Korean Intellectual Property Office, the disclosure of which is incorporated herein in its entirety by reference.

BACKGROUND

1. Field

Present invention relates to a virtual reality device.

2. Description of the Related Art

In the conventional virtual reality technology, how to overcome the deterioration of image quality has been a problem.

In order to realize virtual reality, it is necessary to produce an original image by photographing an image from 360° all directions using a plurality of cameras, and then stitching it. However, just because the original video is stitched in 4K quality does not mean that the quality that users watch is 4K level. This is because the original video encompasses all 360°, so the video actually watched by the user is less than HD level. For example, if an image covering 180° is included in 1080 pixels, an image corresponding to 1° is actually stored in 6 pixels. Therefore, a very low quality image is implemented.

Accordingly, the inventors of the present invention came to complete the present invention after long research and trial and error development in order to solve such a problem.

SUMMARY

The present invention stitches a plurality of virtual reality images from one original image in order to solve such a problem.

The plurality of virtual reality images includes a wide area image generated by stitching all or part of an original image, and a patch image generated by stitching a narrower area than the wide area image. The present invention plays at least one patch image by overlapping the wide area image. In a preferred embodiment, the patch image may be of higher quality than the wide area image. Accordingly, when the user watches a region corresponding to the patch image, the user watches a high-definition image. On the other hand, since the wide area image is played in sync in an area outside the patch image, the image is not interrupted even if the user's gaze deviates from the patch image.

In addition, the plurality of virtual reality images includes a plurality of divided images obtained by dividing the original image into N pieces. The plurality of divided images may not overlap each other or may intentionally overlap a certain area. A plurality of divided images are played in synchronization with each other.

Assuming the same resolution, the quality of a partially stitched image is higher than that of an image stitched with the entire original image. Therefore, the divided image is more advantageous in producing a high-definition image.

The present invention may further comprise content that is played asynchronously in addition to a wide area image, a patch image, and a divided image that are played in synchronization. Hereinafter, this is referred to as asynchronous content. Producers who produce virtual reality images can implement more diverse expression methods by expressing asynchronous content on any one of a plurality of virtual reality images.

Meanwhile, other objects that are not specified of the present invention will be additionally considered within a range that can be easily deduced from the detailed description and effects thereof below.

According to example embodiments, a virtual reality image playing device playing a plurality of virtual reality images to improve the quality of a particular area comprises an image input module configured to receive the plurality of virtual reality images stitched from an original image created to realize virtual reality, a multi-rendering module configured to render the plurality of virtual reality images, a synchronization module configured to generate sync information to synchronize the plurality of virtual reality images and an image playing module configured to use the sync information to play the plurality of synchronized virtual reality images.

The image playing module may comprise a wide area image playing module configured to play a wide area image included in the plurality of virtual reality images and a patch image playing module configured to play a patch image included in the plurality of virtual reality images by overlapping the patch image on the wide area image, wherein it is preferable that the patch image is an image in which a portion of the wide area image is expressed in different image quality.

The image playing module may comprise a plurality of divided image playing modules configured to play divided images included in the plurality of virtual reality images, wherein the divided images configured to be the images that divide the original image into N (N is a natural number greater than 1) areas.

The image playing module may comprise a plurality of divided image playing modules configured to play divided images included in the plurality of virtual reality images overlapping each other, wherein the divided images configured to be the images that divide the original image into N (N is a natural number greater than 1) areas, and at least predetermined area of the divided images are overlapped.

The virtual reality image playing device may further comprise a playing image selection module configured to select a virtual reality image to be played according to the user's gaze and provide the selected virtual reality image to the image playing module.

The virtual reality image playing device may further comprise an asynchronous content display module configured to display an asynchronous content, that is operated or played according to a trigger information irrelevant to sync information, in predetermined of areas of the plurality of virtual reality images.

The synchronization module may generate the sync information according to the last decoded virtual reality image among the plurality of virtual reality images.

According to example embodiments, a virtual reality image generation method for generating a plurality of virtual reality images to improve the image quality of a specific area, which is performed by a multi-resolution virtual reality image generation device that generates the plurality of virtual reality images from an original image, comprises (a) an image input step of receiving the original image to realize virtual reality, (b) a wide area image generation step of stitching a wide area image covering the entire area of the original image and (c) a patch image generation step of stitching a patch image covering a partial area of the original image.

According to example embodiments, a virtual reality image generation method for generating a plurality of virtual reality images to improve the image quality of a specific area, which is performed by a multi-resolution virtual reality image generation device that generates the plurality of virtual reality images from an original image, comprises (a) an image input step of receiving the original image to realize virtual reality, (b) a divided area generation step of dividing the original image into N (N is a natural number greater than 1) non-overlapping divided area and (c) a divided image generation step of stitching N divided images corresponding to each of the N non-overlapping divided area.

BRIEF DESCRIPTION OF THE DRAWINGS

FIG. 1 is a drawing for explaining the concept of a wide area image, a patch image, and a plurality of divided images according to the present invention.

FIG. 2 is a drawing for explaining another embodiment of a divided image according to the present invention.

FIG. 3 is a drawing showing a preferred embodiment of the virtual reality image playing device of the present invention.

FIG. 4 is a drawing showing a preferred embodiment of the synchronization module of the present invention.

FIG. 5 is a drawing showing a preferred embodiment of the virtual reality image generation method of the present invention.

The attached drawings are shown as references to understand the technical ideas of the present invention, and the scope of the present invention is not limited thereto.

DETAILED DESCRIPTION

In describing the present invention, a detailed description shall be omitted, regarding published function, if it is self-evident to those skilled in the art and it is determined that unnecessarily obscure the gist of the present invention.

In present invention, a plurality of virtual reality images are images stitched from an original image, and are a concept comprising a wide area image, a patch image, and a divided image.

FIG. 1 is a drawing for explaining the concept of a wide area image, a patch image, and a plurality of divided images according to the present invention.

The concept of a wide area image and a patch image according to the present invention will be described with reference to FIG. 1(a). Assuming that the entire 360-degree of a virtual reality area 10 is expressed as a sphere, the wide-area image is an image representing a larger area than the entire 360-degree (°) of the virtual reality area 10 or a patch image. Hereinafter, for convenience, the wide area image is described as covering the entire virtual reality area, but is not limited thereto. In principle, wide-area video is always played.

The patch images V1 to V3 are images representing a part of the virtual reality area 10 of 360 degrees. The patch images V1 to V4 may have different areas to be covered, different size of areas, and different image quality. For example, the first patch image V1 may be a high-quality image covering upper and lower partial areas of the front part. If the virtual reality content is a musical, the first patch image V1 may be an area covering the stage of the musical. The second patch image V2 may be an image covering an upper portion of the rear part, and the third patch image V3 may be an image covering a lower portion of the rear part.

The patch images V1 to V3 are played on the wide area image in a overlapped or patched state. Accordingly, even if any one of the played patch images V1 to V3 is turned off as necessary, since the wide area image is being played behind, a blank does not occur in the image.

The patch images V1 to V3 are played in synchronization with the wide area image. This is because the patch images V1 to V3 may cause dizziness to the user if the synchronization of the wide area image is not implemented.

The asynchronous content V4 refers to a content arbitrarily inserted by the intention of the creator, regardless of a plurality of virtual reality images. The asynchronous content V4 may be a video or a specific event operation. According to the content, it may be an advertisement or an event related to virtual reality images.

The asynchronous content V4 is not synchronized with the plurality of virtual reality images. That is, regardless of the sync between the patch images V1 to V3 and the wide area image, they are played or operated by separate trigger information. In a preferred embodiment, the trigger information comprises information on whether the user's gaze towards at the position of the asynchronous content V4.

The concept of the divided images V1 to N of the present invention will be described using (b) of FIG. 1 (N is a natural number greater than 1).

In an embodiment, the divided images V1 to N may be an image obtained by dividing one original image into N regions that do not overlap each other. The plurality of divided images V1 to N may have different sizes and different quality.

A plurality of divided images V1 to N are played in synchronization with each other. Some of the plurality of divided images V1 to N may be turned off as necessary. Although not shown on the drawing, the asynchronous content V4 may be displayed in a certain area of the divided images V1 to N.

FIG. 2 is a drawing for explaining another embodiment of a divided image according to the present invention.

In another embodiment, the divided images V1 to N may overlap each other by a predetermined area. A plurality of divided images V1 to N are played in synchronization with each other. In this case, the overlapped divided images are played by being overlapped each other. Some of the plurality of divided images V1 to N may be turned off as needed.

For example, four divided images covering 180 degrees may overlap each other by 90 degrees (V1 is 270 to 90 degrees, V2 is 0 to 180 degrees, V3 is 90 to 270 degrees, V4 is 180 to 360 degrees). When the gaze coordinate is 45 degrees, V1 and V2 can be turned on and V3 and V4 can be turned off.

By overlapping the divided images in this way, the number of divided images to be played can be reduced. Therefore, the number of divided images to be synchronized is reduced. Thus, the burden on the system is reduced.

In addition, when the divided images are overlapped, there is an advantage in that when the user's gaze changes rapidly, the on/off operation of the divided images according to the user's gaze among the divided images does not need to be tightly controlled. For example, even if V1 is turned off, V2 covers an area between 0 and 90 degrees, which is part of the area covered by V1, so even if the on/off operation of the divided image is delayed, the possibility of occurring blank (a failure situation in which nothing is displayed to the user's gaze) in field of eye-sight of the user is lowered. Meanwhile, an embodiment of a wide area image and a patch image and an embodiment of a divided image may be mixed with each other. For example, a patch image may be played on a part of a plurality of divided images. In this case, the divided image in which the patch image overlaps will be understood as a wide area image.

FIG. 3 is a drawing showing a preferred embodiment of the virtual reality image playing device of the present invention.

The virtual reality image playing device is a device that plays virtual reality images to the user, and may be a wearable device worn on the user's head, but is not limited thereto.

As can be seen in FIG. 3, the virtual reality image playing device 100 of the present invention comprises an image input module 110, a multi-rendering module 120, a synchronization module 130, an image playing module 140, and a playing image selection module 150, gaze information generation module 160, and may include an asynchronous content display module 170.

The image input module 110 receives a plurality of stitched virtual reality images from one original image generated to realize virtual reality. The multi-rendering module 120 renders a plurality of virtual reality images. The synchronization module 130 generates sync information for synchronizing a plurality of virtual reality images. The image playing module 140 plays a plurality of synchronized virtual reality images using sync information.

In one embodiment, the image playing module 140 is a wide-area image playing module that plays a wide-area image included in a plurality of virtual reality images, and a patch image included in the plurality of virtual reality images is overlapped and played on the wide area image. It may comprise a patch image playing module. A patch image is an image that expresses a smaller area than the wide area image.

In another embodiment, the image playing module 140 may comprise a plurality of divided image playing modules for playing the divided images included in the plurality of virtual reality images. The plurality of divided image playing modules may play the divided images overlapped with each other in an overlapped way. The playing image selection module 150 determines on/off of a plurality of patch images or a plurality of divided images as necessary. In a preferred embodiment, the playing image selection module 150 compares information on the user's field of eye-sight with information on the location where the patch image or divided image is played, and determines what is the patch image or divided image played in the corresponding field of eye-sight. The playing image selection module 150 provides information on the image out of the user's field of eye-sight to the image playing module 140 so as to turn off the playing of the image out of the user's field of eye-sight.

The gaze information generation module 160 measures the gaze coordinate at which the user's gaze is located, and determines an area (user's field of eye-sight) that the user can recognize based on the gaze coordinate.

The asynchronous content display module 170 displays asynchronous content on a portion of a plurality of virtual reality images. The asynchronous content display module 170 is operated or played according to independent trigger information irrelevant of sync information of a plurality of virtual reality images. The trigger information is determined in relation to the user's gaze coordinates or a user-recognizable area (user's field of eye-sight) around the gaze coordinates. In a preferred embodiment, the asynchronous content display module 170 receives the user's gaze coordinates from the gaze information generation module 160, compares the user's gaze coordinate with the area where the asynchronous content displayed, and operates or plays asynchronous content when the user's gaze or field of eye-sight can recognize the asynchronous content.

FIG. 4 is a drawing showing a preferred embodiment of the synchronization module of the present invention.

The synchronization module generates sync information according to the last decoded virtual reality image among a plurality of virtual reality images. For example, among the plurality of patch images V1 to V3, assuming decoding of the first frame of the first patch image V1 is completed is t1, and assuming the time when decoding of the first frame of the second patch image V2 is completed is t1', and assuming the time when decoding of the first frame of the third patch image V3 is completed is t1", the first frame of the first to third patch images is played based on t1", which is the last decoding completion time.

FIG. 5 is a drawing showing a preferred embodiment of a virtual reality image generation method of the present invention.

In the virtual reality image generation method of FIG. 5, a multi-definition virtual reality image generation device that generates a plurality of virtual reality images from one original image is an execution subject.

First, an image input step S1100 of receiving an original image is executed to realize virtual reality. It is determined whether to generate a patch image or a divided image S1200.

In the case of generating a patch image, at first, a wide area image generation step S1300 that stitches a wide area image covering the entire area of the original image is performed.

After deciding how many patch images to generate, which area of the original image to be created as a patch image, and how to determine the quality of the patch image, patch image generation step S1400 that stitches the patch image covering a partial area of the original image is executed.

In the case of generating divided images, a divided area generation step S1500 that determines how many divided images will be generated, which areas of the original image each divided image will cover, and how the quality of each divided image will be determined. After executing the divided region generation step S1500, a divided image generation step S1600 that stitches N (N is a natural number greater than 1) divided images corresponding to each of N divided regions is executed.

The present invention has the effect of generating a plurality of virtual reality images from one original image.

The present invention can play a synchronized patch image over a wide area image. The producer can select a necessary part of the original image and produce it as a patch image, and can produce the patch image with higher quality than the wide area image. Therefore, when producing virtual reality content in which the gaze mainly stays on the front part, such as a performance or a lecture, there is an effect that only a part of the area can be created as a high-definition patch image.

In addition, the present invention can generate a divided image obtained by dividing the original image into N pieces. The N divided images may have different quality. Therefore, even in this case, when producing virtual reality content in which the gaze mainly stays on the front part, such as a performance or a lecture, there is an effect that only a part of the area can be generated as a high-definition divided image.

In addition, the present invention may further comprise content that is played unsynchronized in addition to a wide area image, a patch image, and a divided image that are played in synchronization. Producers who produce virtual reality images can implement more diverse expression methods by expressing asynchronous content on any one of a plurality of virtual reality images. For example, when the user's gaze looks at an area in which asynchronous content is placed, separate asynchronous content that is not related to a plurality of virtual reality images being played is activated. The asynchronous content may be not only an image but also various content such as a predetermined operation or an event pop-up.

On the other hand, even if it is an effect not explicitly mentioned herein, it is added that the effect described in the following specification and its provisional effect expected by the technical features of the present invention are treated as described in the specification of the present invention.

What is claimed is:

1. A virtual reality image generation method for generating a plurality of virtual reality images to improve the image quality of a specific area, which is performed by a multi-resolution virtual reality image generation/playing device that generates the plurality of virtual reality images from an original image, the method comprising:
    receiving the plurality of virtual reality images stitched from the original image to realize virtual reality;
    stitching a wide area image included in the plurality of virtual reality images and covering the entire area of the original image;
    stitching a patch image covering a partial area of the original image, wherein the patch image is generated by stitching a narrower area than the wide area image; and
    playing the patch image included in the plurality of virtual reality images by overlapping the patch image on the wide area image,
    wherein the patch image is an image in which predetermined areas of the wide area image are expressed in different image quality.

2. The method of claim 1, wherein the patch image is of a higher quality than the wide area image.

3. The method of claim 1, further comprising:
    generating sync information to synchronize the plurality of virtual reality images; and
    playing the plurality of synchronized virtual reality images using the sync information.

4. The method of claim 3, further comprising:
    selecting a virtual reality image to be played according to a user's gaze.

5. The method of claim 3, further comprising:
    displaying asynchronous content, that is operated or played according to trigger information irrelevant to the sync information, in predetermined areas of the plurality of virtual reality images.

6. The method of claim 3, further comprising:
    generating the sync information according to a last decoded virtual reality image among the plurality of virtual reality images.

7. The method of claim 4, further comprising playing the wide area image in sync with the patch image in an area outside the patch image such that the wide area image is not interrupted when the user's gaze deviates from the patch image.

8. A virtual reality image generation method for generating a plurality of virtual reality images to improve image quality of a specific area, which is performed by a multi-resolution virtual reality image generation/playing device that generates the plurality of virtual reality images from an original image, the method comprising:
    receiving the original image to realize virtual reality;
    dividing the original image into N (N is a natural number greater than 1) divided area;
    stitching N divided images corresponding to each of the N divided area, wherein at least a predetermined area of the divided images are overlapped;
    rendering the plurality of virtual reality images with the stitched images such that the divided images included in the plurality of virtual reality images overlap each other;
    generating sync information to synchronize the plurality of virtual reality images; and
    playing the plurality of synchronized virtual reality images using the sync information.

9. The method of claim 8, further comprising:
    selecting a virtual reality image to be played according to a user's gaze.

10. The method of claim 8, further comprising:
    displaying asynchronous content, that is operated or played according to trigger information irrelevant to the sync information, in predetermined areas of the plurality of virtual reality images.

11. The method of claim 8, further comprising:
    generating the sync information according to a last decoded virtual reality image among the plurality of virtual reality images.

* * * * *